July 31, 1928.
J. T. HENLEY
1,679,031
VEGETABLE AND FRUIT DISPLAY APPARATUS
Filed Jan. 12, 1927  3 Sheets-Sheet 2
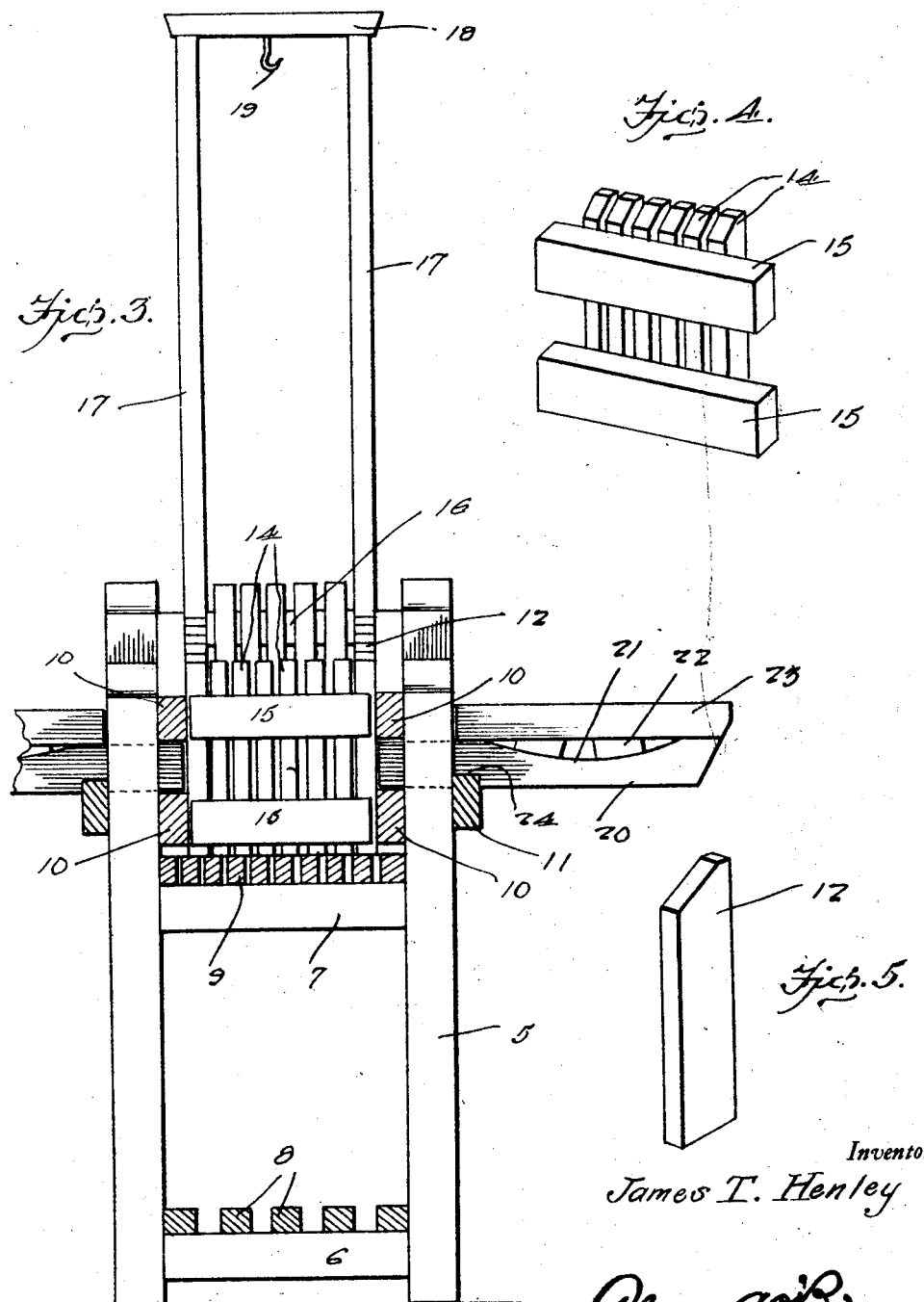
Inventor
James T. Henley
By Clarence A. O'Brien
Attorney

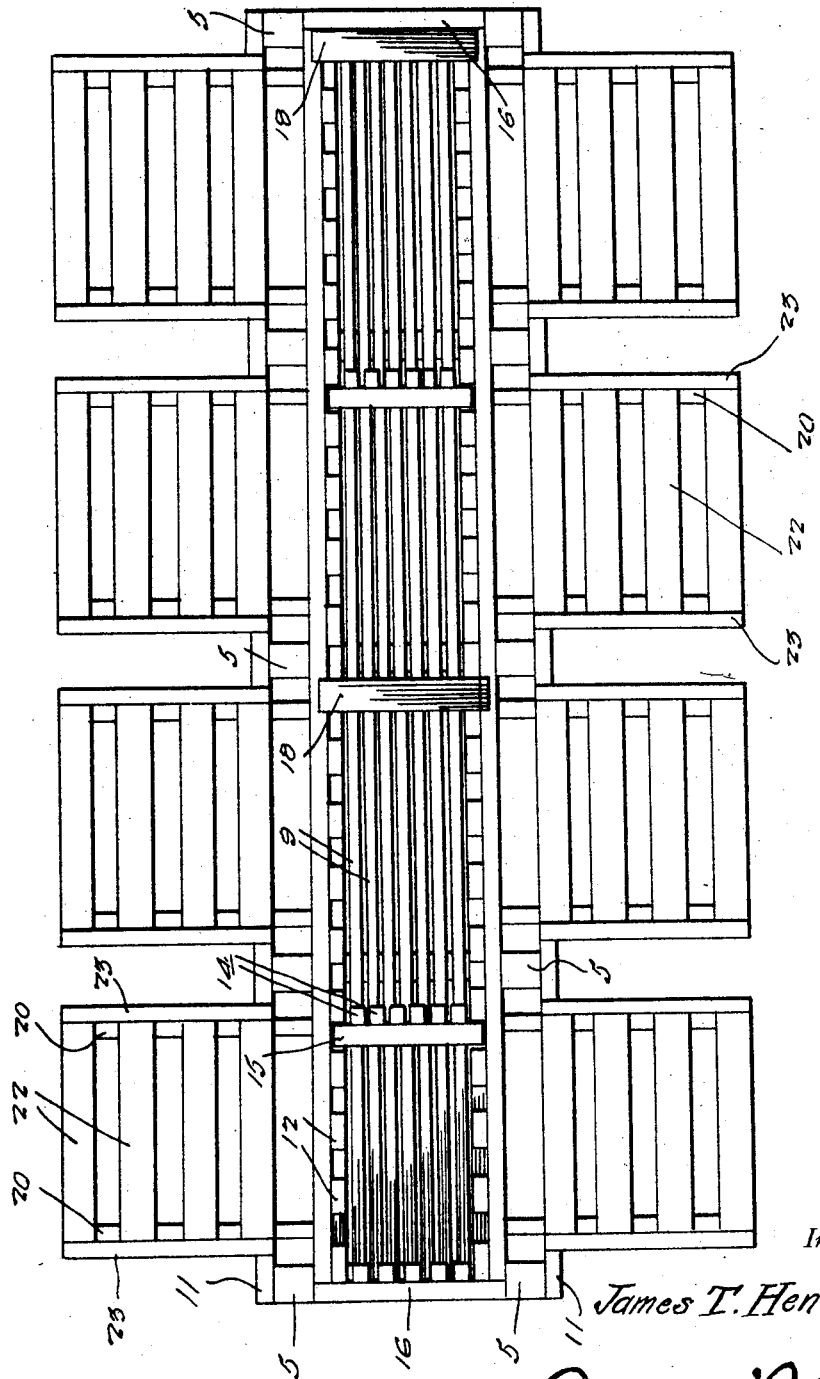

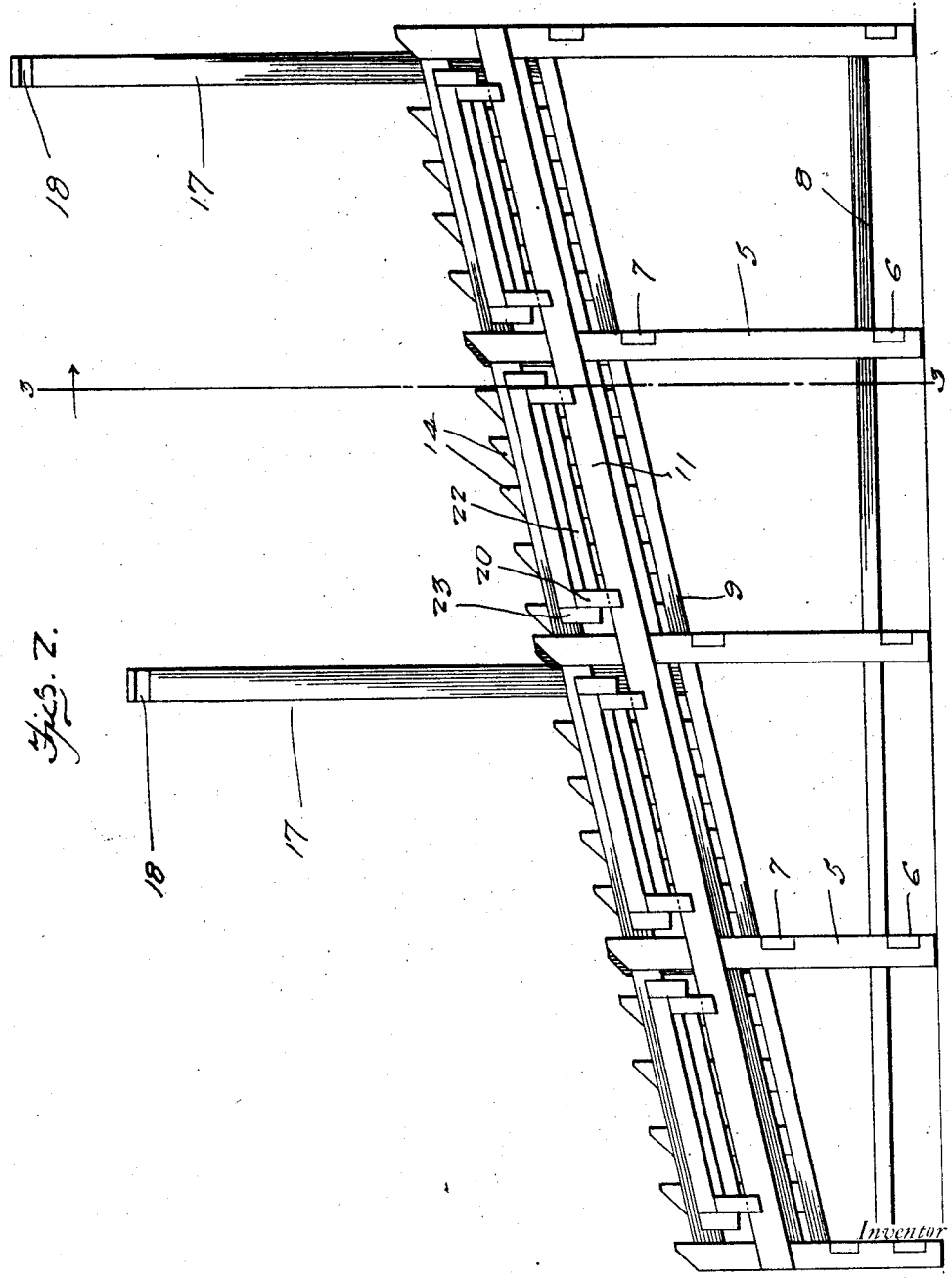

Patented July 31, 1928.

1,679,031

UNITED STATES PATENT OFFICE.

JAMES THOS. HENLEY, OF INVERNESS, MISSISSIPPI.

VEGETABLE AND FRUIT DISPLAY APPARATUS.

Application filed January 12, 1927. Serial No. 160,657.

The present invention relates to an apparatus for displaying vegetables, fruits, and the like to advantage and aims to provide a structure for holding various vegetables and fruits so that the same may be readily seen and inspected by the customers and conveniently sold.

Another important object of the invention lies in the provision of a structure of this nature which is adjustable in various ways, simple, strong and durable, easy to manipulate, attractive in appearance, and compact.

Another very important object of the invention lies in the provision of a structure of this nature which affords the proper ventilation for the vegetables and fruits displayed therein.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the device embodying the features of my invention, Fig. 2 is a side elevation thereof, Fig. 3 is a vertical section taken substantially on the line 3—3 of Fig. 2, Fig. 4 is a perspective view of one of the partitions, Fig. 5 is a perspective view of one of the pickets.

Referring to the drawing in detail it will be seen that the numerals 5 denote legs which are arranged in pairs. These legs gradually increase in height from the forward end of the device to the rear end of the device as is clearly shown in Fig. 2. The legs of each pair are connected by bottom and top cross pieces 6 and 7 respectively. A plurality of slats 8 are mounted on the cross pieces 6 to extend longitudinally of the device and form a lower shelf on which may be supported numerous articles. By referring to Fig. 2 it will be seen that the cross pieces 7 are arranged in an inclined series for supporting a plurality of longitudinally extending inclined slats 9. Inclined side rails 10 are fixed to the inner sides of the legs 5 in spaced parallel relation. There are two of these side rails 10 on each side of the device. Brace rails 11 are fixed to the outer sides of the legs 5, one to each side of the device. The upper edges of the brace rails 11 are disposed in parallelism and slightly above the upper edges of the side rails 10 as is clearly shown in Fig. 3. A plurality of vertically extending pickets 12 are fixed to the side rails 10 in spaced relation to one another. Partitions are formed by a plurality of pickets 14 attached to cross bars 15. Each partition has two cross bars 15 which project beyond the end pickets 14 as is clearly shown in Figure 4 so that these ends of the cross bars may be inserted in spaces between pickets 12. The partitions will divide the apparatus up into a plurality of bins the size of which may be varied, as will be apparent, by varying the location of the partitions. The two pairs of end rails have cross pieces 16 attached thereto for forming the ends of the end bin. Two pair of posts 17 are attached to the side rails 10 between certain of the pickets 12 and support top cross bars 18 having the hooks 19 depending therefrom so that scales or the like may be suspended therefrom.

A plurality of trays project from the sides of the device. Each tray includes a pair of parallel supporting bars 20, having portions of their upper edges cut away as at 21 in a curved manner. Cross rails 22 are fixed on the upper edges of the bars 20 and side rails 23 are also attached thereto, thus completing the tray. The supporting bars 20 project from beyond the inner end of the tray and on their outer edges have notches 24 for receiving the upper edge of straight rail 11 where extremities go between side rails 10. Thus by lifting the upper end of the tray the supporting bars 20 may be easily disengaged from the device.

It is thought that the construction, utility, and advantages of this invention will now be clearly understood by those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of the parts may be resorted to without departing from the spirit or scope of the invention as hereinafter claimed or sacrificing any of its advantages.

Having thus described my invention what I claim as new is:

1. A device of the class described including, in combination, an elongated inclined structure comprising on each side, a pair of vertically spaced longitudinally extending parallel side rails and a brace rail, a plurality of trays each comprising supporting bars having notches on their under edges adjacent one end in which the adjacent brace rail is disposed, the extremities of the supporting bar being disposed between the side rails, and a plurality of vertically disposed pickets fixed to the side rails in spaced relation to one another.

2. A device of the class described including, in combination, an elongated inclined structure comprising on each side, a pair of vertically spaced longitudinally extending parallel side rails, and a brace rail, a plurality of trays each comprising supporting bars having notches on their under edges adjacent one end in which the adjacent brace rail is disposed, the extremities of the supporting bar being disposed between the side rails, a plurality of vertically disposed pickets fixed to the side rails in spaced relation to one another, a plurality of partitions each including cross pieces having spikes thereon, the extremities of the cross pieces being disposed between the pickets on the side rails.

3. A device of the class described including a plurality of legs arranged in pairs, the lengths of the legs of the pairs gradually increasing from the front end of the device to the rear end thereof, inclined side rails fixed to the legs and extending longitudinally of the device, two side rails on each side of the device being disposed in parallel spaced relation to each other, brace rails on the outer sides of the legs, said brace rails being disposed substantially alongside the lower side rails and below the upper side rails, a plurality of trays each comprising supporting bars having notches in which the respective brace rail is disposed, the extremities of the supporting bars being disposed between the side rails, the supporting bars having their upper edges cut away, rails disposed on the cut away portion, a plurality of pickets attached to the side rails to extend vertically, said pickets being disposed in spaced relation to one another, a plurality of partitions each including a plurality of pickets attached to a pair of cross pieces, the ends of which are disposed between the pickets of the side rails.

4. A device of the class described including a plurality of legs arranged in pairs, the lengths of the legs of the pairs gradually increasing from the front end of the device to the rear end thereof, inclined side rails fixed to the legs and extending longitudinally of the device, two side rails on each side of the device being disposed in parallel spaced relation to each other, brace rails on the outer sides of the legs, said brace rails being disposed substantially alongside the lower side rails and below the upper side rails, a plurality of trays each comprising supporting bars having notches in which the respective brace rail is disposed, the extremities of the supporting bars being disposed between the side rails, the supporting bars having their upper edges cut away, rails disposed on the cut away portion, a plurality of pickets attached to the side rails to extend vertically, said pickets being disposed in spaced relation to one another, a plurality of partitions each including a plurality of pickets attached to a pair of cross pieces, the ends of which are disposed between the pickets of the side rails, and cross pieces between the legs of each pair, longitudinally extending rails supported on the cross pieces to form an inclined bottom on which the partitions rest.

In testimony whereof I affix my signature.

JAMES THOS. HENLEY.